United States Patent [19]
Inami et al.

[11] Patent Number: 5,238,880
[45] Date of Patent: Aug. 24, 1993

[54] METHOD OF MANUFACTURING GRADIENT INDEX OPTICAL ELEMENTS

[75] Inventors: Minoru Inami, Hachiohji; Satoshi Noda, Akishima, both of Japan

[73] Assignee: Olympus Optical Company Limited, Japan

[21] Appl. No.: 838,106

[22] Filed: Feb. 18, 1992

[30] Foreign Application Priority Data

Feb. 15, 1991 [JP] Japan .................................. 3-42800

[51] Int. Cl.$^5$ .............................................. C03C 4/00
[52] U.S. Cl. .......................................... 501/12; 501/53; 65/30.13; 65/18.1
[58] Field of Search ................... 501/12, 53; 65/30.13, 65/18.1

[56] References Cited

U.S. PATENT DOCUMENTS

| | | | |
|---|---|---|---|
| 4,686,195 | 8/1987 | Yamane | 501/12 |
| 4,797,376 | 1/1989 | Caldwell et al. | 501/12 |
| 4,902,650 | 2/1990 | Caldwell et al. | 501/12 |
| 5,068,208 | 11/1991 | Haun et al. | 501/12 |
| 5,069,700 | 12/1991 | Yamane et al. | 501/12 X |

*Primary Examiner*—Karl Group
*Attorney, Agent, or Firm*—Bruce L. Adams; Van C. Wilks

[57] ABSTRACT

A method of manufacturing gradient index optical element comprises preparing a sol using silicon alkoxide and a metal alkoxide as a dopant source of index-modifying cations. The sol is treated to obtain a wet gel. Metal alkoxide from the wet gel is eluted by immersing the wet gel in a solvent to produce a concentration gradiation of the metal alkoxide in the wet gel, and the wet gel is then washed. The steps of eluting and washing are repeated so that a gradient index optical element is produced having a large difference in refractive index between the outer periphery portion and the center of the gel.

9 Claims, 1 Drawing Sheet

METHOD OF MANUFACTURING GRADIENT INDEX OPTICAL ELEMENTS

BACKGROUND OF THE INVENTION

1. Field of the Invention

The present invention relates to a method of manufacturing gradient or distributed index optical elements with the use of a sol-gel process applied to the manufacture of optical elements such as an optical lens.

2. Description of the Related Art

In manufacturing gradient index optical elements having a gradient index in the diametrical direction, hitherto, there has been carried out a sol-gel process.

As a method of producing a concentration gradient in the sol-gel process, the methods described in, for example, "Journal of Non-Crystalline Solids", Vol. 100 (1988), pp. 383–387, are well known. In these methods, a sol is prepared by adding a titanium metal in the form of a metal alkoxide as a source of index modifying cations (dopant) to a silicon alkoxide for forming a high refractive index. After subjecting the silica sol to a gelling treatment to form a wet gel, this wet silica gel is dipped in a solution such as an acid capable of eluting the above dopant. After washing any residual eluting solution, the silica gel is dried and sintered.

In the gradient or distributed index optical elements formed in the above-described conventional manufacturing method, the step of imparting a gradient index is performed only one time. In this case, the refractive index at the outer periphery portion of the gradient index optical elements is decreased to some extent, but the concentration of the dopant contributing to formation of the refractive index distribution is not sufficiently decreased, so that a large value of difference in refractive index ($\Delta n$) between the center portion and the outer periphery portion of the optical elements can not be obtained.

Since the eluting solution producing a concentration gradient to the dopant in the wet gel does not present dopant into the gel, then theoretical if the gel is immersed in the eluting solution, as shown in FIG. 1 by a dot-dash line 1, the concentration of the dopant at the outer periphery portion of the optical elements becomes zero. However, as shown in FIG. 1 by a solid line 2, actually, the dopant concentration does not become zero, and the refractive index exhibits a high value at the outer periphery portion, so that a large difference in refractive index $\Delta n$ can not be obtained to the extend expected from the theoretical value.

SUMMARY OF THE INVENTION

It is an object of the present invention to overcome the above described disadvantages of the conventional method for manufacturing gradient index optical elements.

It is another object of the present invention to provide gradient index optical elements having a larger difference in refractive index $\Delta n$ compared with conventional gradient index optical elements.

It is a further object of the present invention to provide gradient index optical elements in which the difference in refractive index between the center portion and the outer periphery portion of the optical elements can be made large.

To this end, according to the present invention, there is provided a method of manufacturing gradient index optical elements utilizing a sol-gel process, which includes repeating a step of leaching at or eluting the alkoxide dopant from a wet gel obtained from a sol including a silicon alkoxide and a metal alkoxide for raising a refractive index several times.

According to the present invention, there is provided a method of manufacturing gradient index optical elements comprising: a first step of preparing a sol by adding a metal alkoxide including metal constituents for raising a refractive index into a silicon alkoxide to from thereby a source of index-modifying dopants and then subjecting the sol to a gelling treatment to obtain a wet gel; a second step of immersing the wet gel in a solution capable of leaching out or eluting the dopant, thereby producing a concentration gradient of the dopant in the gel, thereafter washing the gel, the second step being repeated plural times: and a third step of drying and sintering the wet gel.

In the execution of the second step for the first time, the wet gel is immersed in the solution for a longer period of time than during the execution of the second step subsequent times.

Also during the execution of the second step for the first time, the wet gel is immersed in the solution for a period of time sufficient for the solution to reach the center portion of the gel, which is equal to or longer than the time period required for execution of the second step subsequent times.

In the execution of the second step for the second and subsequent times, the wet gel is immersed in the solution for a period which is shorter than that required for the solution to reach the center portion of the gel.

It has been found by the inventors that if the refractive index gradient producing step including the washing of the residue eluting solution in the gel after eluting the dopant is repeated plural times, gradient index optical elements having a large difference in refractive index $\Delta n$ can be obtained. That is, after producing a concentration gradient of the as in the past, the inventive process does not proceed to the step of drying the wet gel at once, but rather the above dopant concentration gradient producing step is again performed. In this case, the concentration of the dopant at the outer periphery portion of the gel is made lower than that at the center portion of the gel under the conditions that the concentration of the dopant at the center portion of the gel is held constant.

In case of mixing silicon alkoxide $Si(OR)_4$ and metal alkoxide $M(OR')_m$, thereby preparing a sol and gelling the sol to prepare a gel, it is considered that a frame construction consisting of Si-O-M chemical bonding has been formed in the gel.

The step of producing a concentration gradient of the dopant in to the gel consists of three processes, namely, a diffusion process of the immersing solution in the gel, a cutting and reacting process from the frame construction of the gradient index imparting dopant and a diffusion process of the dissolved dopant to the outside of the gel.

According to the manufacturing method of the present invention, the refractive index at the outer periphery portion of the gel can be decreased while holding the refractive index at the center portion of the gel constant, so that gradient index optical elements having larger difference in refractive index ($\Delta n$ ) compared with conventional elements are achieved.

DETAILED EXPLANATION OF THE PREFERRED EMBODIMENT

Figure 1:
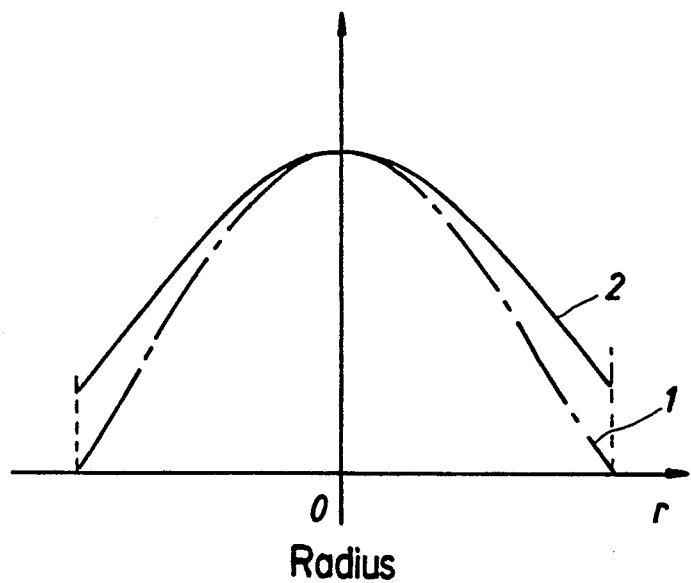
FIG. 1 is a graph showing the concentration gradient of the index-modifying dopants constituent in the wet gel.

In a method of manufacturing gradient index optical elements of the present invention, as shown in FIG. 1 by a solid line 2, the gradient index-producing time of the first execution of concentration gradient producing step is determined in such a manner that the concentration gradient of the producing metal constituent (dopant) after the washing step takes on a convex shape. That is, the first execution of the concentration gradient producing step continues until the immersing solution reaches the center portion of the gel, at which time the gradient index-producing dopant is cut from the frame and dissolved and then the dissolved dopant is capable of diffusing outside of the gel.

Then, the gradient index producing time of the second execution of the concentration gradient producing step due to the immersion process is determined by approximately calculation, from the diffusion rate, the time during which the immersing solution does not reach the center portion of the gel. According to the second immersion step, the concentration of the metal alkoxide for imparting a gradient index is decreased at only the outer periphery portion of the gel and thus the refractive index at the outer periphery portion becomes further decreased, so that a larger difference in refractive index $\Delta n$ compared to the conventional element can be realized.

When the concentration gradient producing step is carried out many times instead of two times, an even larger difference in refractive index difference $\Delta n$ can be realized, and thus the concentration gradient shape can be controlled precisely.

EXAMPLE 1

9.2 ml of 2N-hydrochloric acid was added in a mixed solution consisting of 75.5 ml of silicon tetramethoxide (0.51 mol) and 183.4 ml of isopropanol (2.4 mol), and after being stirred for 30 minutes, 30.8 ml of titanium tetra-n-buthoxide (0.09 mol) is added therein. The, 0.01N-ammonia aqueous solution is added in the thus obtained solution, thereby preparing a sol. Thereafter, the thus obtained sol was poured in a polypropylene container having an inner diameter of 11 mm and sealed with an aluminum foil and it was left to stand for 24 hours and thereafter a wet gel was obtained.

The thus obtained wet gel was aged for four days at 40° C. and thereafter it was dipped in 6N-hydrochloric acid for 2 hours, thereby performing the imparting of the concentration distribution of titanium in the gel. After this immersion, the gel was dipped in a methanol and the hydrochloric acid in the gel was washed.

Thereafter, the gel was dipped in 6N-hydrochloric acid for 24 minutes and the second step of producing a concentration gradient for a second time was performed. The obtained gel was dipped in a methanol in the same manner as the second concentration gradient producing step of the first time, to thereby wash the hydrochloric acid, and it was then dried to obtain a wet gel having a diameter of 5 mm. The obtained wet gel was inserted in a tubular furnace and heated with a temperature rising rate of 10° C./hr from room temperature to 350° C. It was then calcined at a heating temperature of 1200° C., thereby obtaining a transparent glass body having a diameter of 3.4 mm.

The gradient index in the radial direction of the obtained cylindrical glass body was measured at the cross-section of its center portion in the longitudinal direction and the measured results are shown in FIG. 1 by a solid line 3 and as follows. That is, the glass body has a refraction index nd=1.566 at its center portion, a refractive index nd =1.488 at its periphery portion and a difference in refractive index ($\Delta n$)=0.078.

COMPARATIVE EXAMPLE

The wet gel formed in the same manner as in Example 1 is subjected to the second concentration gradient producing step only one time, for two hours, and dried and calcined to form a glass body. The gradient index in the radial direction of the thus obtained glass body was measured at the cross-section of its center portion in the longitudinal direction, and the measured results are as follows. That is, the thus obtained glass body has a refractive index nd=1.566 at its center portion, a refractive index nd=1.527 at its periphery portion and a difference in refraction index ($\Delta n$)=0.039.

EXAMPLE 2

The wet gel formed in the same manner as in Example 1 was subjected to the second concentration gradient producing step for a first time of two hours and then to two kinds of second concentration gradient producing steps of each for a second time of 8 minutes and 16 minutes, respectively, to obtain two glass bodies. The gradient index in the radial direction of the obtained glass body was measured at the cross-section of its center portion in the longitudinal direction and the measured results in the same manner as the above. The value of the difference in refractive index $\Delta n$ was obtained as shown in the following Table 1.

TABLE 1

|  | Concentration gradient producing time | | Difference in refractive index |
|---|---|---|---|
|  | First time | Second time | ($\Delta n$) |
| Example 1 | 2 hours | 24 minutes | 0.078 |
| Example 2 | 2 hours | 8 minutes | 0.051 |
|  | 2 hours | 16 minutes | 0.065 |
| Comparative Example | 2 hours |  | 0.039 |

It is found from the measured results of Example 1, Example 2 and the Comparative Example that by performing the second concentration gradient producing step for a second time, the degree of the decreasing of the titanium constituent at the outer periphery of the gel is dependent on the length of the immersing time, and the difference in refractive index $\Delta n$ can be controlled by the immersing time of the second concentration gradient producing step performed a second time.

EXAMPLE 3

The wet gel formed in the same manner as in Example 1 was subjected to the second concentration gradient producing step for a first time, for two hours, and then to the second concentration gradient producing step for a second time, for 16 minutes, thereby obtaining a wet gel. The obtained wet gel was subjected to the second concentration gradient producing step for a third time, for 8 minutes, and then for a fourth time, for 5 minutes. Thereafter wet gels were respectively dried and calcined, thereby obtaining a transparent glass body.

The gradient index in the radial direction of the obtained glass body was measured at the cross-section of its center portion in the longitudinal direction in the same manner as above, and the measured results are shown in a following Table 2 together with the difference in refractive index ($\Delta n$) of Example 1 and Comparative Example. It has been found that by performing the concentration gradient producing step several times, the titanium constituent of the outer periphery portion of the gel becomes decreased gradually by eluting the lead constituent in every concentration gradient producing step, so that the difference in refractive index $\Delta n$ can be controlled.

TABLE 2

|  | Concentration gradient producing time | | | | Difference in refractive index ($\Delta n$) |
| --- | --- | --- | --- | --- | --- |
|  | First time | Second time | Third time | Fourth time | |
| Example 1 | 2 hours | 24 minutes | | | 0.078 |
| Example 3 | 2 hours | 16 minutes | 8 minutes | | 0.076 |
|  | 2 hours | 16 minutes | 8 minutes | 5 minutes | 0.082 |
| Comparative Example | 2 hours | | | | 0.039 |

EXAMPLE 4

The wet gel formed in the same manner as Example 1 is dipped in a 6N-hydrochloric acid for 30 minutes, and this gel is dipped in a methanol. Then the hydrochloric acid in the gel is washed. This concentration gradient producing step is repeated four times and thereafter the gel is dried and sintered, thereby obtaining a glass body.

The gradient index in the radial direction of the obtained glass body was measured. It was found that the gradient index of this glass body has a shape having a flat center portion and an outer periphery portion with a difference in refractive index distribution $\Delta n$, instead of a parabolic shape. This gradient index in the radial direction of the glass body may be indicated as per following formula, in which r is a radius.

$$N(r) = n_0 + n_1 r^2 + n_2 r^4 + n_3 r^6 + \ldots$$

What is claimed is:

1. A method of manufacturing a gradient index optical element utilizing a sol-gel process, comprising the steps of:
   (a) preparing a sol by adding a metal alkoxide as a source of refractive index-modifying dopant to silicon alkoxide;
   (b) subjecting said sol to a gelling treatment to obtain a wet gel;
   (c) immersing said wet gel in a solvent to elute some of said dopant from said gel to produce a concentration gradient of said dopant in said gel, and thereafter washing said gel;
   (d) repeating the above sep (c) at least once; and
   (e) drying said wet gel to obtain a dry gel and sintering said dry gel.

2. A method of manufacturing a gradient index optical element according to claim 1; wherein the duration of the immersing of the wet gel carried out in step (c) is greater than the duration in each repeated immersing of the wet gel carried out in step (d).

3. A method of manufacturing a gradient index optical element according to claim 1; wherein the immersing of the wet gel in step (c) is carried out for a duration sufficient to allow the solvent to reach the center of the 4. A method of manufacturing a gradient index optical element according to claim 1; wherein each repeated immersing of the wet gel in step (d) is carried out for a duration insufficient to allow the solvent to reach the center of the gel.

5. A method of manufacturing a gradient index optical element according to claim 1; wherein the silicon alkoxide is silicon tetramethoxide.

6. A method of manufacturing a gradient index optical element according to claim 5; wherein the metal alkoxide is titanium tetra-n-buthoxide.

7. A method of manufacturing a gradient index optical element according to claim 1; wherein the metal alkoxide is titanium tetra-n-buthoxide.

8. A method of manufacturing a gradient index optical element according to claim 1; wherein the repeating step is performed twice.

9. A method of manufacturing a gradient index optical element according to claim 1; wherein the repeating step is performed three times.

* * * * *

UNITED STATES PATENT AND TRADEMARK OFFICE
CERTIFICATE OF CORRECTION

PATENT NO. : 5,238,880
DATED : August 10, 1993
INVENTOR(S) : Fumiki Sato and Kenzo Ushiro It is certified that error appears in the above-indentified patent and that said Letters Patent is hereby corrected as shown below:

Column 2 Line 37 "bout" should read --about--.

Column 3 Line 5 "o" should read --to--.

Column 3 Line 43 "delay" should read --relay--.

Column 4 Line 5 "About" should read --about--.

Claim 1 Line 64 Column 4 "food" should read --foot--.

Signed and Sealed this

Fifteenth Day of March, 1994

Attest:

BRUCE LEHMAN

Attesting Officer    Commissioner of Patents and Trademarks